United States Patent
Seibt et al.

(10) Patent No.: US 8,621,677 B2
(45) Date of Patent: Jan. 7, 2014

(54) ODOUR SEAL FOR A VACUUM TOILET DRAIN SYSTEM

(75) Inventors: Christian Seibt, Buchholz (DE); Peter Hilse, Hamburg (DE)

(73) Assignee: Airbus Operations GmbH (DE)

( * ) Notice: Subject to any disclaimer, the term of this patent is extended or adjusted under 35 U.S.C. 154(b) by 621 days.

(21) Appl. No.: 12/712,253

(22) Filed: Feb. 25, 2010

(65) Prior Publication Data

US 2010/0219293 A1    Sep. 2, 2010

Related U.S. Application Data

(60) Provisional application No. 61/155,985, filed on Feb. 27, 2009.

(30) Foreign Application Priority Data

Feb. 27, 2009  (DE) .................. 10 2009 010 862

(51) Int. Cl.
| E03D 11/00 | (2006.01) |
| E03D 11/18 | (2006.01) |
| B64D 11/00 | (2006.01) |
| B64C 1/00 | (2006.01) |
| F16K 15/14 | (2006.01) |

(52) U.S. Cl.
USPC ............. 4/431; 4/426; 244/118.5; 244/129.1; 137/848

(58) Field of Classification Search
USPC ............ 4/679, 252.1, 252.4–252.6, 431, 439, 4/426; 137/848, 512, 512.3, 513
See application file for complete search history.

(56) References Cited

U.S. PATENT DOCUMENTS

| 425,530 | A | * | 4/1890 | Wayte | 137/848 |
| 1,827,028 | A | * | 10/1931 | Malcom | 137/848 |
| 5,133,853 | A | * | 7/1992 | Mattsson et al. | 210/104 |
| 6,012,678 | A | * | 1/2000 | Hale et al. | 244/118.5 |
| 6,752,167 | B1 | * | 6/2004 | Stanaland et al. | 137/218 |
| 7,243,681 | B2 | * | 7/2007 | Dahm | 137/846 |
| 2004/0049846 | A1 | * | 3/2004 | Cornwall | 4/679 |
| 2007/0245473 | A1 | | 10/2007 | Seibt et al. | |
| 2008/0201832 | A1 | | 8/2008 | Seibt | |

FOREIGN PATENT DOCUMENTS

| DE | 102006016030 | 10/2007 |
| DE | 102007004832 | 8/2008 |
| EP | 1174549 A2 | 1/2002 |
| EP | 1447485 A2 | 8/2004 |
| EP | 1477617 A2 | 11/2004 |

* cited by examiner

Primary Examiner — Gregory Huson
Assistant Examiner — Christine Skubinna
(74) Attorney, Agent, or Firm — Lerner, David, Littenberg, Krumholz & Mentlik, LLP

(57) ABSTRACT

The invention relates to an odor seal for a vacuum toilet drain system whose cross section in the state of no throughflow tapers off in such a way in the downstream direction that the interior walls on the downstream end of the odor seal rest against each other so that the odor seal in a downstream direction allows throughflow while in the opposite direction it blocks throughflow, wherein the downstream end of the odor seal is closed in the state of throughflow and no throughflow of the odor seal. Furthermore, the invention relates to a drainage device comprising such an odor seal and a sieve which is arranged upstream of the odor seal. Moreover, the invention relates to a vacuum toilet system for an aircraft, comprising such an odor seal or a drainage device.

7 Claims, 3 Drawing Sheets

ODOUR SEAL FOR A VACUUM TOILET DRAIN SYSTEM

CROSS-REFERENCE TO RELATED APPLICATIONS

This application claims the benefit of the filing date of U.S. Provisional Patent Application No. 61/155,985 filed Feb. 27, 2009, the entire disclosure of which application is hereby incorporated herein by reference.

FIELD OF THE INVENTION

The invention relates to an odour seal for a vacuum toilet drain system as well as to a drainage device, a vacuum toilet system for an aircraft, and an aircraft comprising such an odour seal.

BACKGROUND OF THE INVENTION

In known flushing devices for a vacuum toilet with, for example, a urinal, after use of the urinal, first a flushing liquid is supplied to the urinal, and subsequently a suction removal valve is opened in order to transport urine, flushing liquid and other impurities into the region of a waste water tank. Often a closing valve is provided in the waste water line in order to control the suction removal process or to acoustically seal the waste water system off from the vacuum system during the suction process. Frequently, clogging in the drain system occurs, for example due to impurities or dirt, so that usually an overflow device is provided in order to prevent damming up in the urinal, wherein this overflow at some location needs to be led back into the drain system in order to reliably drain off overflowing liquid. In this arrangement drainage devices, such as an overflow or a main drainage, must make it possible for a liquid to reliably flow off, and it must ensure sealing off of odour relative to the waste water or the drain system.

In stationary sanitary applications, the requirements of liquids outflow and sealing off of odour are met with the use of odour seals. However, the embodiments of these odour seals from stationary sanitary applications are designed only for a pure outflow function without vacuum suction removal, and consequently they cannot be used in vacuum systems involving high volume flows. In the hitherto commercially available odour seals in a vacuum system the noise emissions that arise during the flushing process are excessive, and consequently in this respect there is a need for improvement.

From DE 10 2007 004 832 A1 a drainage device with an odour seal for a vacuum toilet drain system is known.

BRIEF SUMMARY OF THE INVENTION

An exemplary embodiment of the invention is based on the generic state of the art by providing an odour seal for a vacuum toilet drain system whose cross section in the state of no throughflow tapers off in such a way in the downstream direction that the interior walls on the downstream end of the odour seal rest against each other so that the odour seal in a downstream direction allows throughflow while in the opposite direction it blocks throughflow, wherein the downstream end of the odour seal is closed in the state of throughflow and no throughflow of the odour seal. In this arrangement, terms such as "downstream" or "upstream" refer to the intended installation positioning of the odour seal. The flow resistance caused as a result of the tapering off of the cross section on the downstream end of the odour seal results in the odour seal distending during the suction removal process, thus assuming a defined stable geometry which is maintained during the entire suction removal process, which stable geometry prevents any fluttering with associated noise emissions. This exemplary embodiment may thus provide an odour seal which at first makes possible odour-free and silent outflow of fluid (in particular a liquid medium) in the provided flow direction through the odour seal without there being a pressure differential between the odour seal entry and the odour seal exit, and during the flushing process makes it possible to remove fluid (in gaseous or liquid form) by vacuum suction without or less odour or noise, in which vacuum suction on the exit side lower pressure is present at the odour seal than is the case on the entry side. The closing or sealing at the downstream end of the odour seal causes the flow resistance in the downstream direction to be further increased which in turn results in faster and more reliable opening of the odour seal in the downstream direction. Furthermore, fluttering of the downstream end during the suction removal process is reliably prevented. In the upstream direction thus more reliable blockage may be achieved because it is impossible for the gases or odours arising from the waste water system to move upstream through the odour seal.

According to a further exemplary embodiment, the odour seal is produced from a material that is selected from the group comprising Teflon, latex, silicon, caoutchouc or a mixture of these. These materials are essentially resistant to alkaline solutions, acid solutions and saltwater and provide good flexibility and long-term stability, even with frequent movement, as well as good ageing stability.

According to a further exemplary embodiment, the odour seal is designed so that in a region in which in the state of no throughflow the interior walls rest against each other there is at least one aperture in a wall of the odour seal. By means of the size of such an aperture the odour seal can be adjusted, i.e. the flow resistance that arises during flowing through the odour seal for distending the odour seal and thus for opening the odour seal can be adjusted by way of the size of the aperture.

In this context it may also be favourable if several such openings are provided.

According to a further exemplary embodiment, a drainage device is provided which comprises an odour seal according to one of the preceding exemplary embodiments and comprises a sieve which is arranged upstream of the odour seal. By means of such a sieve a large input of dirt into the odour seal may be prevented, which would otherwise possibly cause a blockage of the odour seal.

According to a further exemplary embodiment, a drainage device is provided which comprises an odour seal in which in a region in which in the state of no throughflow the interior walls rest against each other there is at least one opening in a wall of the odour seal, and further comprises a sieve whose through-apertures are smaller than the apertures in the wall of the odour seal. As a result of the apertures of the sieve being smaller than the apertures in the odour seal, the input of dirt of a size that it cannot move through the openings of the odour seal may be prevented which reliably prevents blocking of the odour seal.

According to a further exemplary embodiment, a vacuum toilet system for an aircraft with an odour seal or a drainage device according to one of the preceding exemplary embodiments is provided. Such a vacuum toilet system may provide an advantage in that as a result of the very simple design of the odour seal it is possible to do without expensive means (e.g. controlled valves, etc.) to reduce noise emissions, and the vacuum toilet system is thus more economical and easier to produce and is also lighter in weight.

According to a further exemplary embodiment, an aircraft comprising such a vacuum toilet system is provided, which may be advantageous in that as a result of the simple design it is possible to save weight—a very significant factor in the context of aircraft.

Below, exemplary embodiments of the invention are described with reference to the figures.

DETAILED DESCRIPTION

Figure 1:
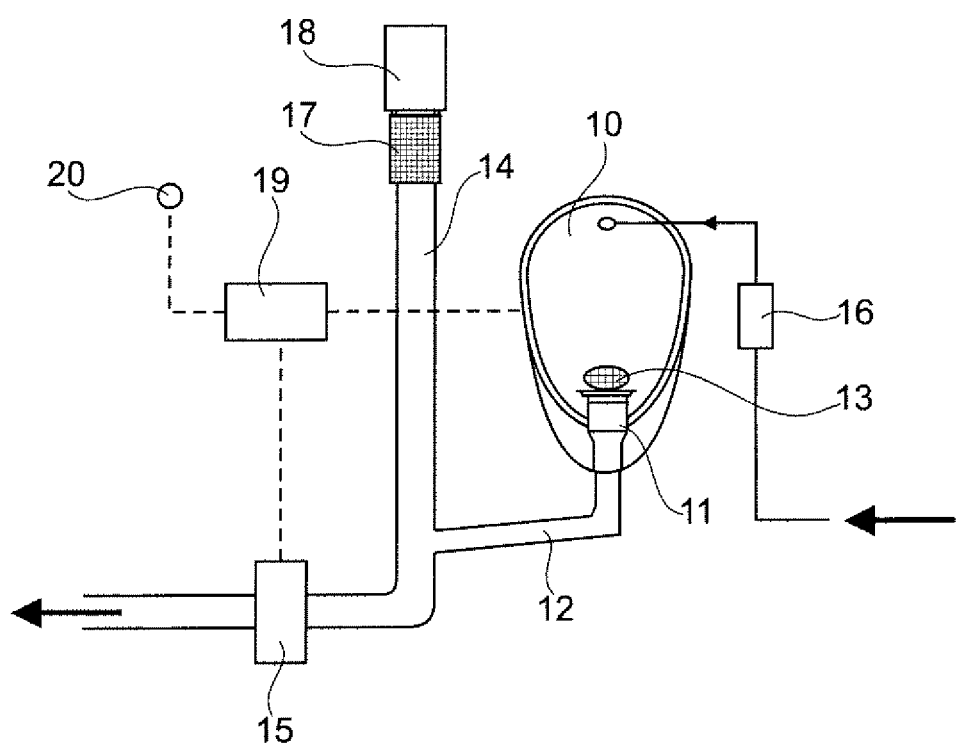
FIG. 1 shows a vacuum toilet system for an aircraft, according to an exemplary embodiment of the invention.

FIG. 1 shows a vacuum toilet system for an aircraft, according to an exemplary embodiment of the invention. The toilet system comprises a urinal bowl 10 with a drainage device 11 that is connected to a urinal bowl drain line 12. The drainage device 11 contains the odour seal, which will be explained later, as well as a sieve 13. The sieve 13 is placed on the entry end of the odour seal or upstream of the odour seal. The urinal bowl drain line 12 opens into a bypass line 14, which by way of a suction removal valve 15 is connectable to a vacuum system (not shown). In this arrangement the urinal bowl drain line 12 opens upstream of the suction removal valve 15 into the bypass line 14. A flushing-water supply comprising a flushing valve 16 can be provided, which flushing-water supply during flushing action feeds flushing water into the urinal bowl 10. Upstream of the entry of the urinal bowl drain line 12 into the bypass line 14 a bypass odour stopper 17 is provided. It shall prevent odours and noises from the bypass line 14 from reaching the outside. The end of the bypass line 14, which end supplies ambient air, i.e. in the bypass line 14 upstream of the bypass odour stopper 17, a sound absorber 18 is provided so that only slight perceptible noise emissions on the bypass line 14 occur. The system furthermore comprises a control unit 19, which after activation of a flushing button 20 controls the flushing valve 16 and the suction removal valve 15. Furthermore, an overflow can be provided in the urinal bowl 10 above the drainage device 11, which overflow also comprises an odour seal, which is explained later. During flushing action the main fluid flow is fed through the bypass line 14 that is coupled to the vacuum system via the suction removal valve 15. With the use of a bypass line 14 it is possible to feed only a small fluid flow through the urinal bowl 10, and to feed the required fluid flow essentially for conveying impurities, the urine and the flushing liquid through the bypass line 14. As a result of this, because of the reduced fluid flow at the drainage device 11, noise development can be greatly reduced. By providing a sound absorber 18 on the end of the bypass line 14 it is furthermore possible to cause lower perceptible noise emissions on the bypass line 14. The main fluid flow is fed by way of the bypass line 14. The resulting high flow speed in the bypass line 14 requires flow-optimised components in order to reduce tonal fractions, in particular high-frequency fractions, and in order to ensure optimum outward removal into the vacuum system. In FIG. 1, the positioning of the odour seal provided in the drainage device 11, and of the odour seal provided in the overflow, is such that the tapering-off end of the odour seal points towards the vacuum system, i.e. the tapering-off end points downwards in FIG. 1.

The vacuum system (not shown) comprises an interface to the aircraft cabin, wherein disposal devices (urinals, toilets, etc.) can be connected to this interface, in which disposal devices drainage devices (such as the drainage device 11) are provided. Apart from their drainage function, the drainage devices provide further functions, such as the prevention of odour emissions (for example from the pipe architecture) and noise emissions during the suction removal process. In the embodiment according to the invention to this effect a membrane odour seal is provided, which in the inlet region is designed as a "thin-walled hose" (membrane) and which in the flow direction of the fluid tapers off to such an extent that the regions of the interior walls rest against each other, thus against the direction of flow assuming the function of an odour barrier. Preferably the outermost hose end is closed, and discharge of the fluid is made possible by means of a defined number and size of outlet openings (holes) before the outermost hose end. The flow resistance through the tapering cross section at the outlet of the odour seal (holes) causes the odour seal to distend during the suction removal process, and thus assumes a defined stable geometry that prevents fluttering with associated noise emissions.

Figure 2:
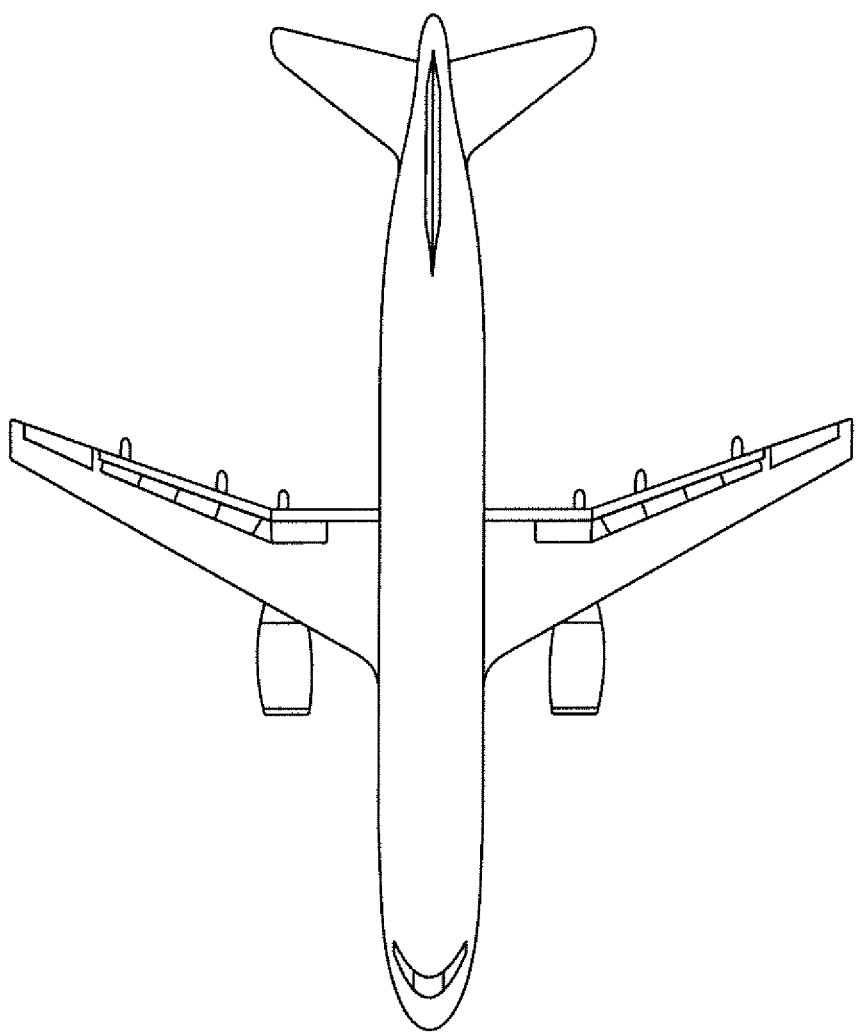
FIG. 2 shows an aircraft in which the vacuum toilet system is installed.

FIG. 2 shows an aircraft in which the vacuum toilet system is installed.

Figure 3A:
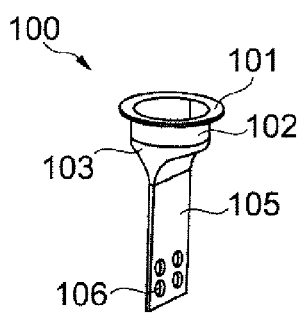
FIG. 3a shows a three-dimensional view of an odour seal according to a first exemplary embodiment of the invention.
Figure 3B:
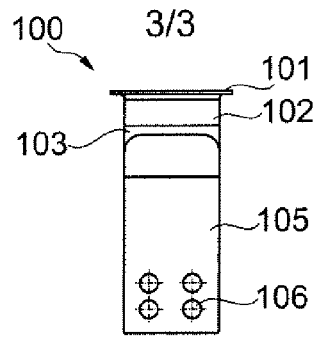
FIG. 3b shows a front view of the odour seal according to the first exemplary embodiment of the invention.
Figure 3C:
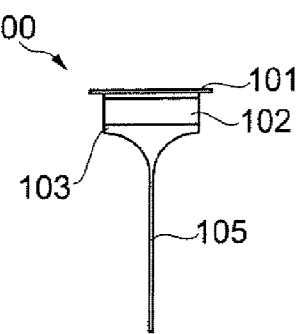
FIG. 3c shows a lateral view of the odour seal according to the first exemplary embodiment of the invention.
Figure 3D:
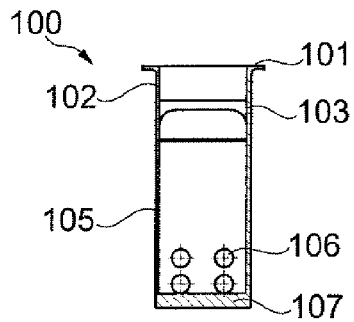
FIG. 3d shows a section view of the odour seal according to the first exemplary embodiment of the invention.

FIGS. 3a to 3d show a first exemplary embodiment, according to the invention, of the odour seal, wherein FIG. 3a shows a three-dimensional view, FIG. 3b a front view, FIG. 3c a lateral view, and FIG. 3d a section view. The upstream end of the odour seal 100 comprises a flat-ring-shaped flange 101. Downstream in the direction of flow, the flange 101 is followed by a cylindrical section 102. In this arrangement the interior diameter of the flange 101 corresponds to the interior diameter of the cylindrical section 102. In downstream direction this cylindrical section 102 is followed by a further cylindrical section 103 of short length. Directly following this cylindrical section 103 and downstream of it the cross section of the odour seal 100 tapers off in such a way that the interior walls of the odour seal 100 finally rest against each other in a region 105. Across this direction of tapering-off the dimension of the odour seal 100 remains almost unchanged. In the lateral view of FIG. 3c this tapering-off shows as a circular path, which at a right angle starts from the cylindrical section 103 to the middle of the odour seal 100 and finally ends in a longitudinal direction of the odour seal 100, wherein the circular path is curved towards the middle of the odour seal 100. The shapes presently described refer to the state of no throughflow through the odour seal 100. In the region of the last third (relative to the overall length of the odour seal 100) of the downstream end of the odour seal 100 there are apertures 106 in the wall of the odour seal. These apertures 106 establish a connection between the interior and the exterior of the odour seal 100; they have been incorporated on both sides of the odour seal 100, i.e. in the walls that rest against each other in the region 105. Preferably, on each side of the odour seal 100 four circular openings are provided. At the downstream end of the odour seal 100 the latter is closed off by way of a region 107. This region 107 extends between the downstream edge of the odour seal 100 and that aperture which is situated furthest downstream of the apertures 106. The odour seal 100 is thus a tubular thin-walled element of a geometric design as described above, which element on the downstream end is closed off over a region 107, for example in that the walls have been bonded together. The odour seal is in particular suitable for the drainage device 11 in a vacuum toilet drain system for an aircraft, wherein the drainage device 11 is particularly suited to a urinal bowl drainage. The embodiment of the odour seal arranged in the urinal bowl overflow (see second exemplary embodiment) essentially differs from the odour seal arranged in the urinal bowl drainage only by a different attachment concept in the drainage device. The odour seal 100 is designed as a thin-walled hose or membrane and is made from a material selected from the group comprising the following materials or a mixture thereof: Teflon, latex, silicon or caoutchouc.

During operation, the tapering off as well as the sealing at the downstream end and the cross-section ratios of the apertures 106 result in the creation of a flow resistance in the downstream direction, as a result of the fluid flowing through, which flow resistance causes the odour seal to distend, thus coming to a defined stable geometric shape. The fluid (gases and/or liquid) flowing in at the entry end leaves the odour seal 100 by way of the apertures 106. In this arrangement, the cross section of the apertures 106 has been selected such that a certain back pressure is maintained, which results in the odour seal 100 remaining distended, and thus refraining from fluttering, as long as fluid enters at the entry end. As soon as the fluid flow ceases, the odour seal 100 returns to its original shape as shown in FIGS. 3a to 3d, in which in the region 105 the interior walls rest against each other so that the odour seal is blocked. Thus neither odours nor noise can pass upstream through the odour seal against the direction of flow. By preventing any fluttering it is also possible to prevent noise, which would otherwise have been associated with such fluttering, while fluid flows through. The material and the dimensions of the odour seal 100 are to be selected according to the flow conditions and pressure conditions in the vacuum system.

Below, a second exemplary embodiment of the invention is described, wherein this exemplary embodiment differs only in that it is, in particular, adapted for installation in a urinal overflow device, and thus essentially only differs in its fastening concept in the corresponding drainage device.

Figure 4A:
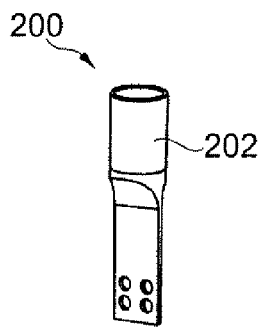
FIG. 4a shows a three-dimensional view of an odour seal according to a second exemplary embodiment of the invention.
Figure 4B:
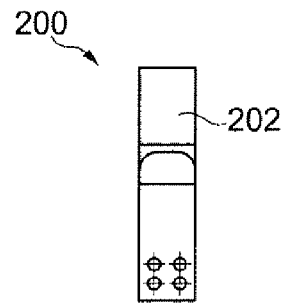
FIG. 4b shows a front view of the odour seal according to the second exemplary embodiment of the invention.
Figure 4C:
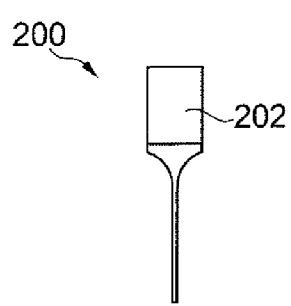
FIG. 4c shows a lateral view of the odour seal according to the second exemplary embodiment of the invention.
Figure 4D:
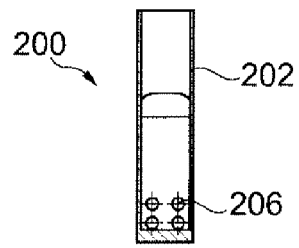
FIG. 4d shows a section view of the odour seal according to the second exemplary embodiment of the invention.

FIGS. 4a to 4d show a second exemplary embodiment of the invention, wherein FIG. 4a shows a three-dimensional view, FIG. 4b a front view, FIG. 4c a lateral view, and FIG. 4d a section view. Below, only those aspects are explained in more detail that differ from the design of the first exemplary embodiment. Thus in relation to structure and functionality of this second exemplary embodiment the comments provided in the description of the first exemplary embodiment apply. The second exemplary embodiment essentially differs only in that the odour seal 200 overall is of a smaller diameter and is of longer overall length. In the second exemplary embodiment the apertures 206 in the odour seal 200 are arranged in the last quarter relative to the overall length of the odour seal 200. The cylindrical section 202 is significantly longer when compared to the cylindrical section 102. Furthermore, no flange is provided at the upstream end of the odour seal 200.

Although, above, the invention was described with reference to preferred exemplary embodiments, various modifications and improvements may be made without leaving the scope of protection of the invention. Furthermore, the invention can also be used in fields other than aviation, for example in trains or ships, where vacuum toilets are used and where there is a problem of reducing noise emissions and odour emissions.

In addition, it should be pointed out that "comprising" does not exclude other elements or steps, and "a" or "an" does not exclude a plural number. Furthermore, it should be pointed out that characteristics that have been described with reference to one of the above further developments can also be used in combination with other characteristics of other improvements described above. Reference characters in the claims are not to be interpreted as limitations.

The invention claimed is:

1. An odour seal configured for a vacuum toilet drain system, comprising:
   a cross section that, in a state of no throughflow, tapers off in such a way in a downstream direction that interior walls on a downstream end of the odour seal rest against each other so that the odour seal in the downstream direction allows throughflow while in an opposite direction blocks throughflow;
   wherein the downstream end of the odour seal is closed in a state of throughflow and the state of no throughflow of the odour seal;
   the seal further comprising, in a region in which in the state of no throughflow the interior walls rest against one another, at least one aperture in a wall of the odour seal;
   wherein the at least one aperture has a size configured such that no fluttering of the odour seal occurs during suction by a vacuum system of the vacuum toilet drain system.

2. The odour seal of claim 1, wherein the odour seal is produced from a material that is selected from the group consisting of Teflon, latex, silicon, caoutchouc and a combination thereof.

3. The odour seal of claim 1, wherein the at least one aperture comprises a plurality of apertures.

4. A drainage device comprising:
   an odour seal configured for a vacuum toilet drain system; and
   a sieve arranged upstream of the odour seal;
   wherein the odour seal comprises:
   a cross section that, in a state of no throughflow, tapers off in such a way in a downstream direction that interior walls on a downstream end of the odour seal rest against each other so that the odour seal in the downstream direction allows throughflow while in an opposite direction blocks throughflow;
   wherein the downstream end of the odour seal is closed in a state of throughflow and the state of no throughflow of the odour seal;
   the seal further comprising, in a region in which in the state of no throughflow the interior walls rest against one another, at least one aperture in a wall of the odour seal;
   wherein the at least one aperture has a size configured such that no fluttering of the odour seal occurs during suction by a vacuum system of the vacuum toilet drain system.

5. The drainage device of claim 4,
   wherein in a region in which in the state of no throughflow the interior walls rest against each other there is at least one aperture in a wall of the odour seal; and
   wherein through-apertures of the sieve are smaller than the at least one aperture in the wall of the odour seal.

6. A vacuum toilet system for an aircraft, comprising an odour seal, said odour seal comprising:
- a cross section that, in a state of no throughflow, tapers off in such a way in a downstream direction that interior walls on a downstream end of the odour seal rest against each other so that the odour seal in the downstream direction allows throughflow while in an opposite direction blocks throughflow;
- wherein the downstream end of the odour seal is closed in a state of throughflow and the state of no throughflow of the odour seal;
- the seal further comprising, in a region in which in the state of no throughflow the interior walls rest against one another, at least one aperture in a wall of the odour seal;
- wherein the at least one aperture has a size configured such that no fluttering of the odour seal occurs during suction by a vacuum system of the vacuum toilet system.

7. An aircraft comprising a vacuum toilet system comprising an odour seal comprising:
- a cross section that, in a state of no throughflow, tapers off in such a way in a downstream direction that interior walls on a downstream end of the odour seal rest against each other so that the odour seal in the downstream direction allows throughflow while in an opposite direction blocks throughflow;
- wherein the downstream end of the odour seal is closed in a state of throughflow and the state of no throughflow of the odour seal;
- the seal further comprising, in a region in which in the state of no throughflow the interior walls rest against one another, at least one aperture in a wall of the odour seal;
- wherein the at least one aperture has a size configured such that no fluttering of the odour seal occurs during suction by a vacuum system of the vacuum toilet system.

* * * * *